May 6, 1958         O. NÜBLING         2,833,223

BEARING ARRANGEMENT FOR HYDRAULIC APPARATUS

Filed Nov. 30, 1953         3 Sheets-Sheet 1

INVENTOR
Otto Nübling
BY
Michael S. Striker
ATTORNEY

May 6, 1958 — O. NÜBLING — 2,833,223
BEARING ARRANGEMENT FOR HYDRAULIC APPARATUS
Filed Nov. 30, 1953

INVENTOR.
Otto Nübling
BY Richard S. Stricker
Attorney

United States Patent Office 2,833,223
Patented May 6, 1958

2,833,223
BEARING ARRANGEMENT FOR HYDRAULIC APPARATUS

Otto Nübling, Weener (Ems), Germany, assignor to Firma Theodor Klatte, Bremen-Huchting, Germany Application November 30, 1953, Serial No. 395,230

Claims priority, application Germany November 28, 1952

10 Claims. (Cl. 103—126)

The present invention relates to a hydraulic apparatus of the type in which an inner rotary member having outer teeth is arranged eccentrically within and meshing with an outer annular member having inner teeth the axes of the two members being parallel. The inner member has preferably one tooth less than the outer member, and the output is adjusted by means of a turntable control valve arranged in an axial bore of the inner member. More particularly, the present invention refers to a bearing arrangement for a hydraulic apparatus of this type.

In hydraulic apparatus of the above-mentioned type the hydraulic pressure presses the two members against each other, if sufficient play for the bearings of the outer and inner members, respectively is provided. Since the relative speed between the two members is low, the loss caused by friction between the meshing teeth is low, but this known arrangement has a disadvantage that the bearings or teeth are resiliently deformed at high pressures so that the teeth are not uniformly worn off, so that the tooth flanks are destroyed due to unduly high pressure on portions thereof.

It is one object of the present invention to overcome the disadvantages in known constructions, and to provide an hydraulic apparatus of the above described type in which the liquid pressure on the rotating members is taken up by a particular bearing arrangement.

It is another object of the present invention to relieve pressure on the main bearings of the outer member and of the inner member, respectively, by supporting the outer member directly on the inner member whereby the liquid pressure forcing the two members apart is directly taken up without stressing the main bearings.

It is also an object of the present invention to mount shaft portions of the inner member in supporting bores of portions of the outer member engaging the same only along a generatrix, whereby the liquid pressure extending in the plane of the generatrix is taken up directly.

It is a further object of the present invention to provide shaft supporting bores whose diameter exceeds the diameter of the shaft portions by twice the distance between the parallel axes of the outer and inner members.

It is still a further object of the present invention to provide an arrangement in which the shaft portions of the inner members roll in bores of tubular extensions of the outer members so that sliding friction of these elements is prevented.

It is yet an object of the present invention to make the tubular portions of the cheek members in which the shaft of the inner member is supported adjustable in the direction of the plane of symmetry passing through the parallel axes of the two members.

With these objects in view, the present invention mainly consists in a hydraulic apparatus, comprising, in combination, a rotary annular outer member, a rotary inner member located within the outer member and having an axis of rotation parallel to the axis of rotation of the outer member, the inner member defining with the outer member liquid-receiving chamber means adapted to receive a liquid under negative pressure, and liquid-discharging chamber means adapted to discharge a liquid under positive pressure so that the liquid in the chamber means presses the inner and outer members against each other, at least one supporting portion rigid with the outer member and being formed with an inner cylindrical surface coaxial with the outer member, and at least one shaft portion rigid with the inner member and having an outer cylindrical surface coaxial with the inner member, the shaft portion being arranged within the supporting portion with the outer cylindrical surface thereof engaging the inner cylindrical surface of the supporting portion along a line of engagement and rolling thereon so that sliding friction is avoided.

The arrangement of the present invention is particularly suited for two cooperating hydraulic machines serving as a transmission in which one machine operates as a pump and is driven at constant speed and with a constant driving power, but pumps variable amounts of liquid, adjusted by a control valve. A machine of the described type produces great liquid pressure when small volumes are moved, but small pressure when large volumes are moved. The high pressure acts in the direction of the plane of symmetry passing through the axes of the inner and outer members, and is taken up directly by the inner and outer members, while only the smaller pressures, acting normal to said plane of symmetry are taken up by the bearings.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
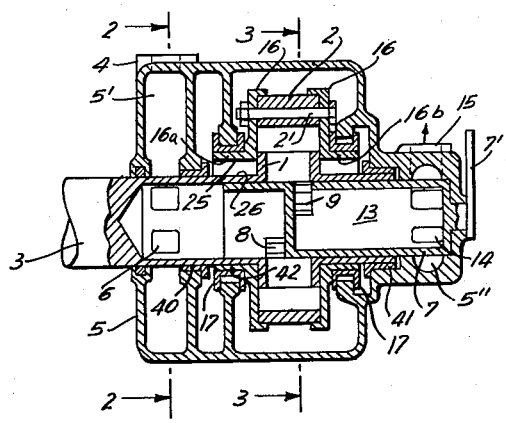
Fig. 1 is an axial sectional view of an hydraulic apparatus according to the present invention, preferably an oil pump.
Figure 3:
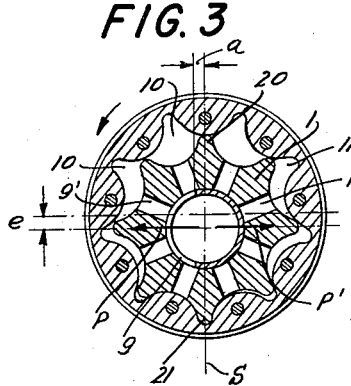
Fig. 3 is a cross sectional view on line 3—3 in Fig. 1.
Figure 4:
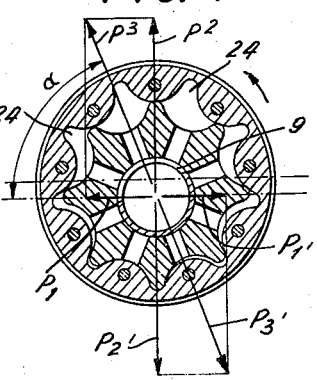
Fig. 4 is a cross sectional view on line 3—3 in Fig. 1, showing an adjusted position of the tubular control valve.

Referring now to the drawings and more particularly to Fig. 1, the inner rotary member 1 meshes with the outer rotary annular member 2. The axes of the two members are parallel, and spaced from each other a distance $e$ so that on one side of the plane of symmetry $S$ passing through the axes of two members, suction chambers increasing in volume, and on the other side of the plane of symmetry $S$, pressure chambers decreasing in volume are formed during rotation. In Figures 3 and 4 the pressure or discharge chambers 10 are located on the left side, and the suction or receiving chambers 11 are located on the right side. A tubular control valve 7 is arranged in a cylindrical bore of the inner member 1, and can be turned relative to the inner member 1 by the lever 7'. The liquid, for instance oil, enters through the inlet 4 into the casing portion 5' of the casing 5, and passes through the openings 3 into the hollow shaft 3 which is fixedly secured to the inner member 1, or forms an integral part of the same, as illustrated in Fig. 1. The liquid flows through the port 8 of the turnable control valve 7 and through the radial slots 12 in the inner member 1 into the receiving suction chambers 11 which are formed between the teeth of the inner and outer members, and increase in volume during rotation in the direction of the arrow.

Since the discharge pressure chambers 10 decreases in volume during rotation, the liquid is pressed through the slots 9' and the port 9 into the discharge portion 13 of the tubular control valve 7, and passes through the openings 14 into the casing portion 5", and out of the outlet 15.

Preferably the ports 8 and 9 of the control valve 7 are so dimensioned that the distance $a$ in Fig. 3 is half the width of the slots 9', and 12, respectively, so that all tooth chambers formed between adjacent teeth of the outer and inner members, respectively, either suck, or press the liquid. Only those tooth chambers which are located between the pressure and suction side of the machine are closed for a short time during rotation.

As shown in Fig. 4, the output of the hydraulic apparatus can be regulated by adjusting the position of the tubular control valve. In the position shown in Fig. 4 the port 9, and the discharge portion 13 of the tubular control valve interconnect pressure tooth chambers with suction tooth chambers so that the liquid circulates in the interior of the hydraulic apparatus. Consequently, it is possible to adjust the hydraulic apparatus. This arrangement is known, and not an object of the present invention.

The outer member 2 carries two cheek members 16 which are secured by bolt means 2'. The cheek members 16 have axially extending tubular journal portions 16a and 16b which are formed with concentric bores 25 whose diameter exceeds the outer diameter 26 of the shaft 3 by at least twice the distance $e$. The outer cylindrical surface 26 of the shaft 3 engages the cylindrical inner surface bore 25 along a line of engagement 42 which is located in the plane of symmetry passing through the parallel axes of the members 1 and 2, and on the same side as the tooth 21 in Fig. 3 which meshes with a corresponding recess in the outer annular member 2. The end portions of shaft 3 are rotatably mounted in bearings 40 and 41, while the outer member 2 is supported in bearings 17 by journal members 16a and 16b.

Figure 2:
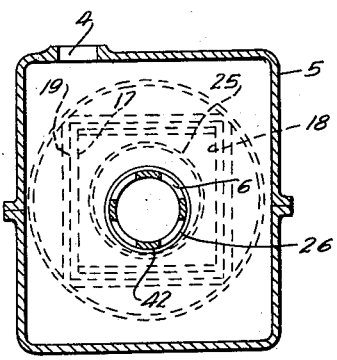
Fig. 2 is a cross sectional view on line 2—2 in Fig. 1.

The bearings 17 are preferably rectangular and are arranged in the casing 5 slidable in the direction of the plane of symmetry S. Consequently, the bearings 17 can be adjusted in the direction of the eccentricity $e$, that is up and down in Fig. 2, but cannot be moved in a direction perpendicular to the plane of symmetry S, that is to the left or right in Fig. 2.

This arrangement of the bearings 17 makes possible an adjustment of the relative position of the outer and inner members, and a reduction of the bearing pressures on the bearings 40 and 41 of the shaft 3, and of the bearings 17 of the journal portions of the outer member 2, as will be explained in greater detail hereinafter.

In the position of the tubular control valve 7 shown in Fig. 3, the teeth 20 and 21 of the inner member 1 separate the pressure chambers 10 from the suction chambers 11. Consequently, the liquid pressure in the chambers produces a pressure P acting on the outer member 2, and a pressure P' acting on the inner member 1 in a direction perpendicular to the plane of symmetry S. These pressures are taken up by the bearings 40, 41 and 17 respectively.

In the event that the hydraulic apparatus is a pump, a torque of P times $e$ is required. When the control valve 7 is adjusted in a known manner and turned into the position shown in Fig. 4, the force $P_3$ acts on the outer member 2, and the force $P_3'$ acts on the inner member 1. Due to the particular characteristics of the above described hydraulic apparatus the forces $P_3$, $P_3'$ are considerably greater than the forces P and P'.

The force $P_3$ has one component $P_1$ and one component $P_2$, and a force $P_3'$ has one component $P_1'$, and one component $P_2'$, as shown in Fig. 4.

In the event that the driving torque acting on the hydraulic apparatus, and the speed of rotation are constant, the forces $P_1$ and $P_1'$ are equal to the forces P and P', since the torque P times $e$ is the same, and are taken up by the bearings and transmitted to the casing. The components $P_2$ and $P_2'$ which are located in the plane of symmetry S are transferred from the outer member 2 directly onto the inner member 1 due to the engagement of the tubular portions 16a, 16b with the shaft 3 at 42. Adjustment of the elements is possible due to the mounting of the bearings 17 in the casing 5 slidable along the guide means 18 and 19 parallel to the plane of symmetry S.

Since the relative speed between the inner member 1 and the outer member 2 is very low, the friction along the lines of engagement 42 will be low. However, according to the present invention the cooperating teeth of the members 1 and 2 are preferably so dimensioned and arranged that the outer cylindrical surface 26 of the shaft 3 rolls on the cylindrical inner surface 25 of the tubular portions 16a, 16b of the cheek plates 16 of the outer member 2, so that any sliding friction is avoided.

In order to obtain rolling friction at the line of engagement 42 between the tubular portions 16a, 16b and shaft 3, it is necessary that the diameter of the pitch circle of the inner teeth of the outer member 2 is equal to the diameter of the inner cylindrical surface 25, and that the diameter of the pitch circle of the outer teeth on the inner member 1 is equal to the diameter of the outer cylindrical surface of the shaft 3. In other words, the inner cylindrical surfaces of the journal members 16a and 16b are formed by a generatrix moving about the axis of the outer member 2 at a distance equal to the radius of the pitch circle of the inner teeth of member 2, and the outer cylindrical surfaces of the journal portions of shaft 3 are formed by a generatrix moving about the axis of the inner member 1 at a distance equal to the radius of the pitch circle of the outer teeth of inner member 7.

Figure 5:
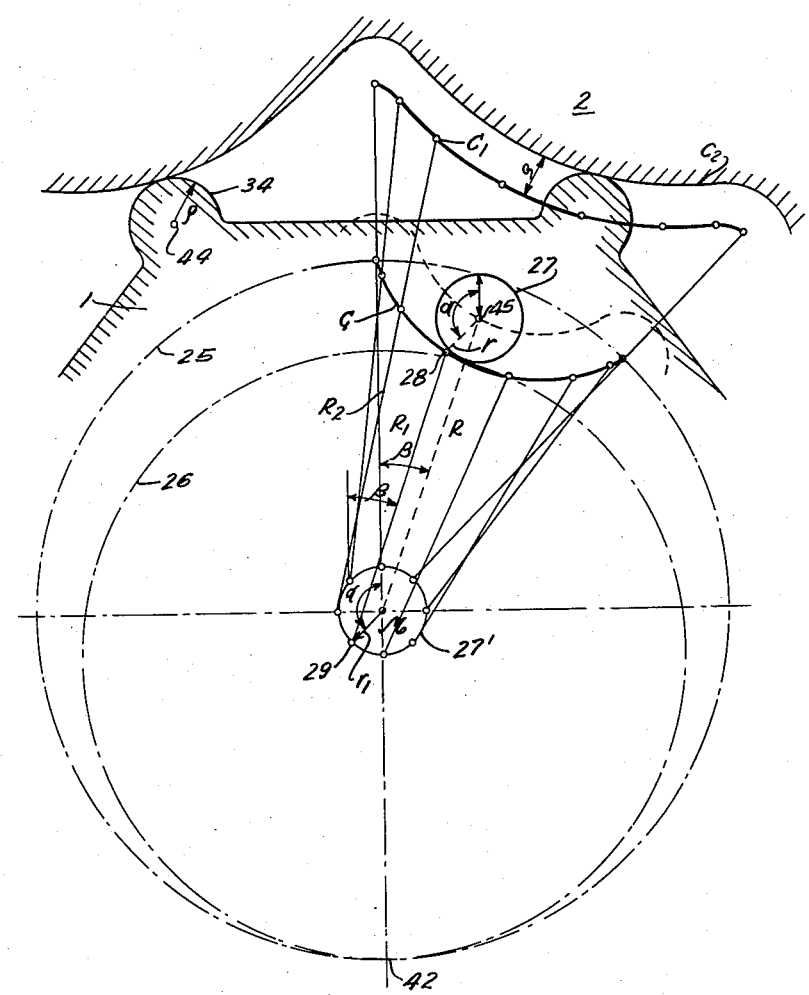
Fig. 5 is a schematic view illustrating the construction of the teeth of the inner and outer members according to one embodiment of the present invention.
Figure 6:
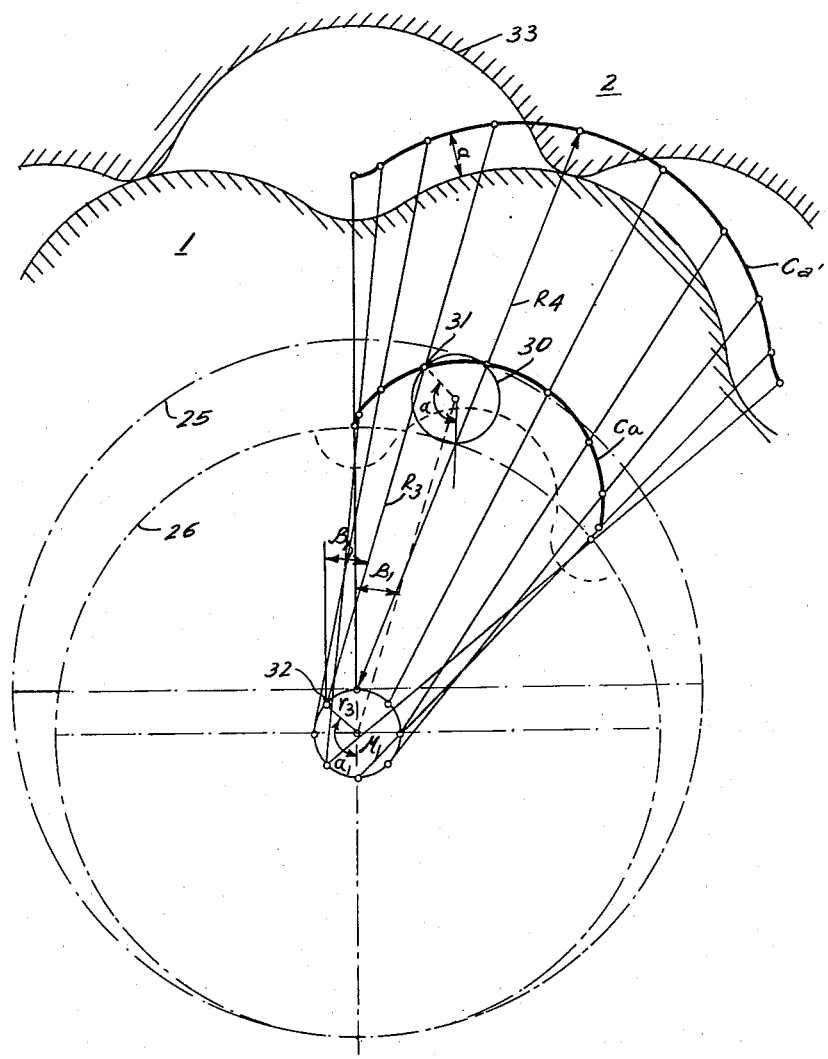
Fig. 6 is a schematic view illustrating the construction of the teeth of the inner and outer members according to another embodiment of the present invention.

The practical embodiments of Figs. 5 and 6 show how this desired condition can be obtained. Referring now to Fig. 5, the tooth heads 34 of the inner member 1 are circular in cross section. Other shapes may be used, but are more difficult to manufacture. In the event that the radius $\rho$ of the tooth heads 34 would be zero, the required cross-section of the axially extending surface of the inner teeth of the outer member 2 would correspond to the curve $C_1$. In the event that the radius $\rho$ is different from zero, the tooth flanks of the outer member 2 extend along a curve $C_2$ which is equidistant from the curve $C_1$ and is spaced from the same the distance $\rho$. The curve $C_1$ is the path of the point 44 of the inner member 1 when the cylinders 25 and 26 roll on each other on the line of engagement 42.

The curve $C_1$ can be constructed in the following manner:

According to Fig. 5, the diameter of the cylindrical inner surface 25 corresponds to the cycloid pitch circle of the outer member 2. A hypocycloid is formed by a point of a generating circle rolling along the inside of a fixed circle. In Fig. 5 the generating circle 27 rolls along the inside of a fixed circle having the diameter 25 of the inner cylindrical surface on which the outer cylindrical surface 26 of the shaft 3 rolls. A point 28 of the generating circle 27 forms the hypocycloid C. Whenever the radius $r$ of the generating circle 27 moves through an angle $\alpha$, the vector R, that is the distance between the center 45 of the generating circle 27 and the center M of the circle 25, turns through the angle $\beta$. Correspondingly, the pitch circle of the inner member 1 should be equal to the diameter of the cylindrical outer surface of the shaft 3. These dimensions cannot be provided in a practical embodiment, since the outer and inner members would become so small that it would be impossible to arrange sealing ledges on both sides of the cheek members 16.

It can be mathematically proven that the same hypocycloid is produced if the generating circle is arranged concentric with the center M of the outer pitch circle 25, and if the vector $R_1$ turns around the end point 29 of the radius $r_1$ of the generating circle 27'. The length of the vector $R_1$ is equal to the distance R between the center 45 of the generating circle 27 and the center M of the pitch circle, while the direction of rotation and rotary speed of $r$ and $r_1$, and of R and $R_1$, are the same. As can be seen in Fig. 5, the radii $r_1$ and $r$ of the generating circles are equal and parallel. Consequently, the curves C are identical regardless of the construction by which they are determined.

In the event that the distance R is increased by at least twice the distance $e$ between the parallel axes of the rotary members 1 and 2, the vector $R_2$ is obtained which produces the curve $C_1$. This curve permits a diameter of the pitch circle of the inner teeth of the outer member 2 which is sufficient for arranging sealing ledges on the cheek members 16. If the tooth flanks of the outer member 2 are designed and produced as described, the cylindrical surfaces 25 and 26 move at the same speed at the line of engagement 42 since the numbers of the teeth of the two members 1 and 2 have the same ratio as the diameters of the cylindrical surfaces 25 and 26 whereby sliding friction at 42 is avoided.

Fig. 6 illustrates in a similar manner how an epicycloid is formed on the inner member 1 for eliminating sliding friction on the line of engagement 42. In the embodiment illustrated in Fig. 6, the effective surface portions 33' of the surface 33 of the inner teeth of the outer member 2 have in cross section a radius of curvature $\rho$. The diameter of pitch circle of the epicycloid is equal to the diameter of the outer cylindrical surface 26 of the shaft 3. The generating circle 30 rolls on the outside of the fixed circle 26, and the point 31 produces an epicycloid $Ca$. As explained with reference to the construction of Fig. 5, the same curve can be produced when the rotating generating circle is arranged concentric with the center $M_1$ of the inner member 1, and when the vector $R_3$ is turned through the angle $\beta_1$. As in Fig. 5, this construction would result in a tooth shape which would not permit the arrangement of sealing ledges on the cheek members 16. In order to make the arrangement practical, the vector $R_3$ is increased to $R_4$ whereby another epicycloid $Ca_1$ is produced according to which the inner member has a diameter sufficient for the arrangement of lateral sealing ledges.

It will be understood that each of the elements described above, or two or more together, may also find a useful application in other types of hydraulic apparatus differing from the types described above.

While the invention has been illustrated and described as embodied in a hydraulic apparatus including an outer and an inner member, in which the liquid pressure forces the two members against each other and is taken up by a pair of cylindrical surfaces which are in rolling engagement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characterisics of the generic or specific aspects of this invention and, therefore, such adaptations should and are intended to be comprehended within the meaning and range of equivalence of the following claims.

What is claimed as new and desired to be secured by Letters Patent is:

1. In a hydraulic apparatus, in combination, a rotary annular outer member having inner teeth; a rotary inner member located within said outer member and having an axis of rotation parallel to the axis of rotation of said outer member, said inner member having outer teeth meshing with said inner teeth of said outer member and defining with said outer member liquid-receiving chamber means adapted to receive a liquid under negative pressure, and liquid-discharging chamber means adapted to discharge a liquid under positive pressure so that the liquid in said chamber means presses said inner and outer members against each other; at least one tubular journal member rigid with said outer member and being formed with an inner cylindrical surface coaxial with said outer member and formed by a generatrix moving about the axis of said outer member at a distance equal to the radius of the pitch circle of the inner teeth of said outer member, the diameter of said inner cylindrical surface being substantially equal to the diameter of the pitch circle of said inner teeth of said outer member; and a shaft rigid with said inner member and having a shaft portion with an outer cylindrical surface coaxial with said inner member and being formed by a generatrix moving about the axis of said inner member at a distance equal to the radius of the pitch circle of said outer teeth of said inner member, the diameter of said outer cylindrical surface being substantially equal to the diameter of the pitch circle of said outer teeth of said inner member, said shaft portion being arranged within said tubular journal member with said outer cylindrical surface thereof engaging said inner cylindrical surface of said tubular journal member along a line of engagement and rolling thereon during relative turning of said rotary inner and outer members whereby sliding friction between said cylindrical surfaces is avoided.

2. In a hydraulic apparatus, in combination, a rotary annular outer member having inner teeth, the tooth flanks of said inner teeth having hypocycloid shape; a rotary inner member located within said outer member and having an axis of rotation parallel to the axis of rotation of said outer member, said inner member having outer teeth meshing with said inner teeth of said outer member and defining with said outer member liquid-receiving chamber means adapted to receive a liquid under negative pressure, and liquid-discharging chamber means adapted to discharge a liquid under positive pressure so that the liquid in said chamber means presses said inner and outer members against each other, the heads of said outer teeth having cycloid shape; at least one tubular journal member rigid with said outer member and being formed with an inner cylindrical surface coaxial with said outer member and formed by a generatrix moving about the axis of said outer member at a distance equal to the radius of the pitch circle of the inner teeth of said outer member, the diameter of said inner cylindrical surface being substantially equal to the diameter of the pitch circle of said inner teeth of said outer member; and a shaft rigid with said inner member and having a shaft portion with an outer cylindrical surface coaxial with said inner member and being formed by a generatrix moving about the axis of said inner member at a distance equal to the radius of the pitch circle of said outer teeth of said inner member, the diameter of said outer cylindrical surface being substantially equal to the diameter of the pitch circle of said outer teeth of said inner member, said shaft portion being arranged within said tubular journal member with said outer cylindrical surface thereof engaging said inner cylindrical surface of said tubular journal member along a line of engagement and rolling thereon during relative turning of said rotary inner and outer members whereby sliding friction between said cylindrical surfaces is avoided.

3. In a hydraulic apparatus, in combination, a rotary annular outer member having inner teeth, the heads of said inner teeth having cycloid shape; a rotary inner member located within said outer member and having an axis of rotation parallel to the axis of rotation of said outer member, said inner member having outer teeth meshing with said inner teeth of said outer member and defining with said outer member liquid-receiving chamber means adapted to receive a liquid under negative pressure, and liquid-discharging chamber means adapted to discharge a liquid under positive pressure so that the liquid in said chamber means presses said inner and outer members against each other, the tooth flanks of said outer teeth having epicycloid shape; at least on tubular journal member rigid with said outer member and being formed with an inner cylindrical surface coaxial with said outer member and formed by a generatrix moving about the axis of said outer member at a distance equal to the radius of the pitch circle of the inner teeth of said outer member, the diameter of said inner cylindrical surface being equal to the diameter of the pitch circle of said inner teeth of said outer member; and a shaft rigid with said inner member and having a shaft portion with an outer cylindrical surface coaxial with said inner member and being formed by a generatrix moving about the axis of said inner member at a distance equal to the radius of the pitch circle of said outer teeth of said inner member, the diameter of said outer cylindrical surface being substantially equal to the diameter of the pitch circle of said outer teeth of said inner member, said shaft portion being arranged within said tubular journal member with said outer cylindrical surface thereof engaging said inner cylindrical surface of said tubular journal member along a line of engagement and rolling thereon during relative turning of said rotary inner and outer members whereby sliding friction between said cylindrical surfaces is avoided.

4. An arrangement as claimed in claim 2 wherein the hypocycloid shape of the tooth flanks of the inner teeth correspond to a hypocycloid produced by a circle having a radius equal to the radius of curvature of said heads of said outer teeth, and rolling on the inside of a circle having a diameter equal to the diameter of said inner cylindrical surface of said journal member.

5. An arrangement as claimed in claim 3 wherein the epicycloid shape of the tooth flanks of said outer teeth corresponds to a hypocycloid produced by a circle having a radius equal to the radius of curvature of said heads of said inner teeth and rolling on the outside of a circle having a diameter equal to the diameter of said outer cylindrical surface of said shaft portion.

6. An arrangement as claimed in claim 1 wherein the tooth flanks of said inner teeth of said outer member have a hypocycloid shape corresponding to a hypocycloid produced by a generating circle which is concentric with said inner cylindrical surface of said journal member and has a radius equal to the radius of curvature of the heads of said outer teeth, and by a vector moving along said generating circle.

7. An arrangement as claimed in claim 1 wherein the tooth flanks of said outer teeth of said inner member have an epicycloid shape corresponding to an epicycloid produced by a generating circle which is concentric with said outer cylindrical surface of said shaft portion and has a radius equal to the radius of curvature of the heads of said inner teeth, and by a vector moving along said generating circle.

8. In a hydraulic apparatus, in combination, a rotary annular outer member; a rotary inner member located within said outer member and having an axis of rotation parallel to the axis of rotation of said outer member, said inner member defining with said outer member liquid-receiving chamber means adapted to receive a liquid under negative pressure, and liquid-discharging chamber means adapted to discharge a liquid under positive pressure so that the liquid in said chamber means presses said inner and outer members against each other; a pair of cheek plates fixedly secured to said outer member and closing said chamber means, each cheek plate having a tubular journal portion, said journal portions extending in opposite axial directions, each journal portion being formed with an inner cylindrical surface coaxial with said outer member and formed by a generatrix moving about the axis of said outer member at a distance equal to the radius of the pitch circle of the inner teeth of said outer member, the diameter of each cylindrical surface being substantially equal to the diameter of the pitch circle of said inner teeth of said outer member; and a shaft rigid with said inner member and having at the ends thereof a pair of shaft portions, each shaft portion having an outer cylindrical surface co-axial with said inner member and being formed by a generatrix moving about the axis of said inner member at a distance equal to the radius of the pitch circle of said outer teeth of said inner member, the diameter of each outer cylindrical surface being substantially equal to the diameter of the pitch circle of said outer teeth of said inner member, said shaft portions being arranged within said journal portions with said outer cylindrical surfaces engaging said inner cylindrical surfaces along aligned lines of engagement and rolling on the same during relative turning of said rotary inner and outer members whereby sliding friction between said cylindrical surfaces is avoided.

9. In a hydraulic apparatus, in combination, a rotary annular outer member; a rotary inner member located within said outer member and having an axis of rotation parallel to the axis of rotation of said outer member, said inner member defining with said outer member liquid-receiving chamber means adapted to receive a liquid under negative pressure, and liquid-discharging chamber means adapted to discharge a liquid under positive pressure so that the liquid in said chamber means presses said inner and outer members against each other; a pair of cheek plates fixedly secured to said outer member and closing said chamber means, each cheek plate having a tubular journal portion, said supporting portions extending in opposite axial directions, each journal portion being formed with an inner cylindrical surface coaxial with said outer member and formed by a generatrix moving about the axis of said outer member at a distance equal to the radius of the pitch circle of the inner teeth of said outer member, the diameter of each cylindrical surface being substantially equal to the diameter of the pitch circle of said inner teeth of said outer member; a pair of bearing means extending around and supporting said journal portions and thereby said outer member; and a shaft rigid with said inner member and having at the ends thereof a pair of shaft portions, each shaft portion having an outer cylindrical surface coaxial with said inner member and being formed by a generatrix moving about the axis of said inner member at a distance equal to the radius of the pitch circle of said outer teeth of said inner member, the diameter of each outer cylindrical surface being substantially equal to the diameter of the pitch circle of said outer teeth of said inner member, said shaft portions being arranged within said journal portions with said outer cylindrical surfaces engaging said inner cylindrical surfaces along aligned lines of engagement and rolling on the same during relative turning of said rotary inner and outer members whereby sliding friction between said cylindrical surfaces is avoided.

10. An arrangement as claimed in claim 9 and including a casing; guide means fixed on said casing and extending parallel to a plane passing through said axes of rotation of said outer and inner members; and wherein said bearing means are slidably mounted in said guide means so as to permit adjustment of the distance between said axes of said outer and inner members for adjusting the position of said inner cylindrical surfaces with respect to said outer cylindrical surfaces.

(References on following page)

References Cited in the file of this patent

UNITED STATES PATENTS

| | | |
|---|---|---|
| 308,061 | Chichester | Nov. 18, 1884 |
| 1,263,550 | Gollings | Apr. 23, 1918 |
| 1,840,869 | Rayburn | Jan. 12, 1932 |
| 2,018,391 | Whitfield | Oct. 22, 1935 |
| 2,053,919 | Pigott | Sept. 8, 1936 |
| 2,397,139 | Heaton | Mar. 26, 1946 |

FOREIGN PATENTS

| | | |
|---|---|---|
| 316,295 | Great Britain | May 15, 1930 |